(12) United States Patent
Smith et al.

(10) Patent No.: US 7,930,761 B2
(45) Date of Patent: Apr. 19, 2011

(54) SECURE DETECTION NETWORK SYSTEM

(75) Inventors: Fred Hewitt Smith, Belmont, MA (US); Benjamin H Smith, New York, NY (US); Cynthia Smith, Belmont, MA (US)

(73) Assignee: Angel Secure Networks, Inc., Orono, ME (US)

( * ) Notice: Subject to any disclaimer, the term of this patent is extended or adjusted under 35 U.S.C. 154(b) by 0 days.

(21) Appl. No.: 12/277,100

(22) Filed: Nov. 24, 2008

(65) Prior Publication Data

US 2009/0083842 A1    Mar. 26, 2009

Related U.S. Application Data

(63) Continuation of application No. 10/600,738, filed on Jun. 20, 2003, now Pat. No. 7,475,428, which is a continuation of application No. 09/441,403, filed on Nov. 16, 1999, now Pat. No. 6,918,038.

(60) Provisional application No. 60/390,204, filed on Jun. 20, 2002, provisional application No. 60/390,205, filed on Jun. 20, 2002.

(51) Int. Cl.
    *G06F 7/04* (2006.01)

(52) U.S. Cl. .......................................... 726/27

(58) Field of Classification Search .................. 726/7, 8, 726/15, 27, 28, 29; 713/186, 153, 168, 170, 713/182, 191
See application file for complete search history.

(56) References Cited

U.S. PATENT DOCUMENTS

| 5,642,394 | A | * | 6/1997 | Rothschild | 378/57 |
| 6,038,666 | A | * | 3/2000 | Hsu et al. | 713/186 |
| 6,523,166 | B1 | * | 2/2003 | Mishra et al. | 717/174 |
| 2003/0126464 | A1 | * | 7/2003 | McDaniel et al. | 713/201 |

* cited by examiner

*Primary Examiner* — Beemnet W Dada
(74) *Attorney, Agent, or Firm* — Pierce Atwood LLP; Ralph Trementozzi

(57) ABSTRACT

A secure detection network system includes plurality of remote nodes, each remote node comprising a set of detector interfaces configured to couple to a set of detectors disposed to detect the presence of an illegal asset within a shipping container; at least one server node configured to initialize, install, and authenticate each remote node in the plurality of remote nodes, including delivering to each remote node an agent module, said agent module for each remote node comprising a node specific configuration file defining a set of nodes with which the remote node can communicate and a different encryption means corresponding to each node in the set of nodes; and a communication path coupling the plurality of remote nodes and the at least one server node.

12 Claims, 4 Drawing Sheets

SECURE DETECTION NETWORK SYSTEM

CROSS-REFERENCE TO RELATED PATENT APPLICATIONS

This application is a continuation of U.S. application Ser. No. 10/600,738, filed Jun. 20, 2003, entitled SECURE DETECTION NETWORK SYSTEM, which claims the benefit of priority under 35 U.S.C. §119(e) from co-pending, commonly owned U.S. provisional patent application Ser. No. 60/390,204, entitled WEAPON DETECTION METHOD AND SYSTEM, filed Jun. 20, 2002 and U.S. provisional patent application Ser. No. 60/390,205, entitled ORTHOGONAL SECURITY SYSTEMS FOR PROTECTING HIGH RISK INFRASTRUCTURE, filed Jun. 20, 2002, and which is a continuation of commonly owned U.S. non-provisional patent application Ser. No. 09/441,403, entitled SYSTEM AND METHOD FOR INSTALLING AN AUDITABLE SECURE NETWORK, filed Nov. 16, 1999, now U.S. Pat. No. 6,918,038.

STATEMENT OF GOVERNMENT INTEREST

The U.S. Government has no interest in or to the present invention.

FIELD OF THE INVENTION

The inventive concepts relate to systems and methods for ensuring security of sensitive assets. More specifically, the present inventions relates to systems and methods that implement secure communications to ensure security of the sensitive assets.

BACKGROUND

There has been a recognition that the United States is at risk of the delivery of weapons of mass destruction to its ports by enemies employing a strategy of hiding such a weapon in a shipping container. Various schemes have been proposed for x-raying containers or otherwise examining containers as they are loaded on ships in the foreign port. Such schemes, however, can be very limited in effectiveness since they can be defeated with x-ray shielding, vulnerable to compromise by rogue employees and the contents of the containers altered after they are loaded in the foreign port.

To a limited degree, the notion of embedding detecting devices in a container, which communicate with external systems, has been implemented in unsecure applications. For example, Sensitech, based in Beverly, Mass. (www.sensitech.com), provides solutions in the food and pharmaceuticals fields that are used for monitoring temperature and humidity for goods in-process, in-transit, in-storage, and on-display. So, temperature and humidity monitors can be placed in storage and transit containers to ensure desired conditions are maintained.

However, such data is not generally considered sensitive with respect to security issues. Rather, it is used for ensuring the products in the container do not spoil by being subjected to unfavorable temperature and humidity conditions. Consequently, secure communications, tamper resistance and detection are not particularly relevant issues in such settings. Additionally, such monitors do not monitor for the presence of suspicious content or materials, no matter where they may be introduced in the chain.

Even if detectors are introduced into a container and interfaced to an external system, an "enemy" may employ any of a variety of strategies to defeat such a detection system. For instance, an enemy may attempt to shield the suspicious materials or activities from the detectors; defeat the communication interface between the detectors and the external system, so that the interface does not report evidence of suspicious materials or activities sensed by the detectors; disconnect the detectors from the interface; surreptitiously load a container that contains an atomic weapon, but that does not contain detecting devices, onto a container ship; overcome external systems so that they incorrectly report on the status of the detectors.

The difficult aspect of the environment is that the detecting devices and the communications interface will be in the hands of the potential enemy for some period of time, at least for the period of time necessary to load the container. Also, since the potential enemy is presumed capable of constructing an atomic weapon, the enemy must be presumed able to utilize other advanced technologies suitable for defeating the detecting devices and the interface.

SUMMARY OF THE INVENTION

A system and method for providing a secure detection network system includes a plurality of nodes, each node comprising a processor and storage means. Such nodes include a plurality of remote nodes, each remote node comprising a set of detector interfaces configured for coupling to a set of detectors disposed for detecting the presence of an illegal condition. The illegal condition may include the presence of one or more suspicious materials, including chemical weapons, biological weapons nuclear weapons, chemical agents, biological agents, radioactive materials, illegal drugs, explosive materials or devices, or shielding means. The illegal condition may also include a suspicious activity, including an attempt to defeat a remote node or detector. The remote nodes can be provided within a tamper resistant box, that could be coupled to a sensitive, for example. Sensitive assets could include, for example, assets such as a shipping container, vehicle, human, event, room, area or building. Within the box may also be provided a set of detectors. The detectors are configured to detect the illegal condition, and could also detect an attempt to compromise the detector, remote node, or sensitive asset.

To establish a secure network, and each node therein, at least one server node generates and distributes to each node an intelligent agent module and a set of node specific configuration files, selectively including software and data files. For each node, the configuration files include information defining for that node a set of other nodes with which the node can communicate. This includes providing a different encryption means corresponding to each node in the set other nodes. Installation of a node includes executing the downloaded to agent and configuration files. Once installation is complete, strobing of the encryption means (e.g., key pairs) between nodes can be included.

At least one monitor node can be provided to couple to and audit other nodes in the secure network, including the remote nodes. This auditing function may include receiving signals indicating an illegal condition or tampering with a remote node. A robot node could also be provided, as another form of monitor node, which could be hosted on a portable platform. These nodes could include wired or wireless interfaces, as could the server nodes and the remote nodes.

Selectively causing one or more nodes to terminate communication and to remove itself from the secure network in response to one or more termination events may also be provided. In such a case, the one or more termination events could include detecting tampering of one or more remote nodes.

Communication between remote nodes and other nodes, such as a monitor node or server node, could be accomplished via one or more other intermediate nodes. Subnetworks may be formed from a set of remotes nodes, wherein each subnetwork could provide a portion of the communication path to the monitor node and server node for a given remote node.

As an additional form of security, orthogonal authentication could also be provided, such as by using independent biometric information about an individual.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
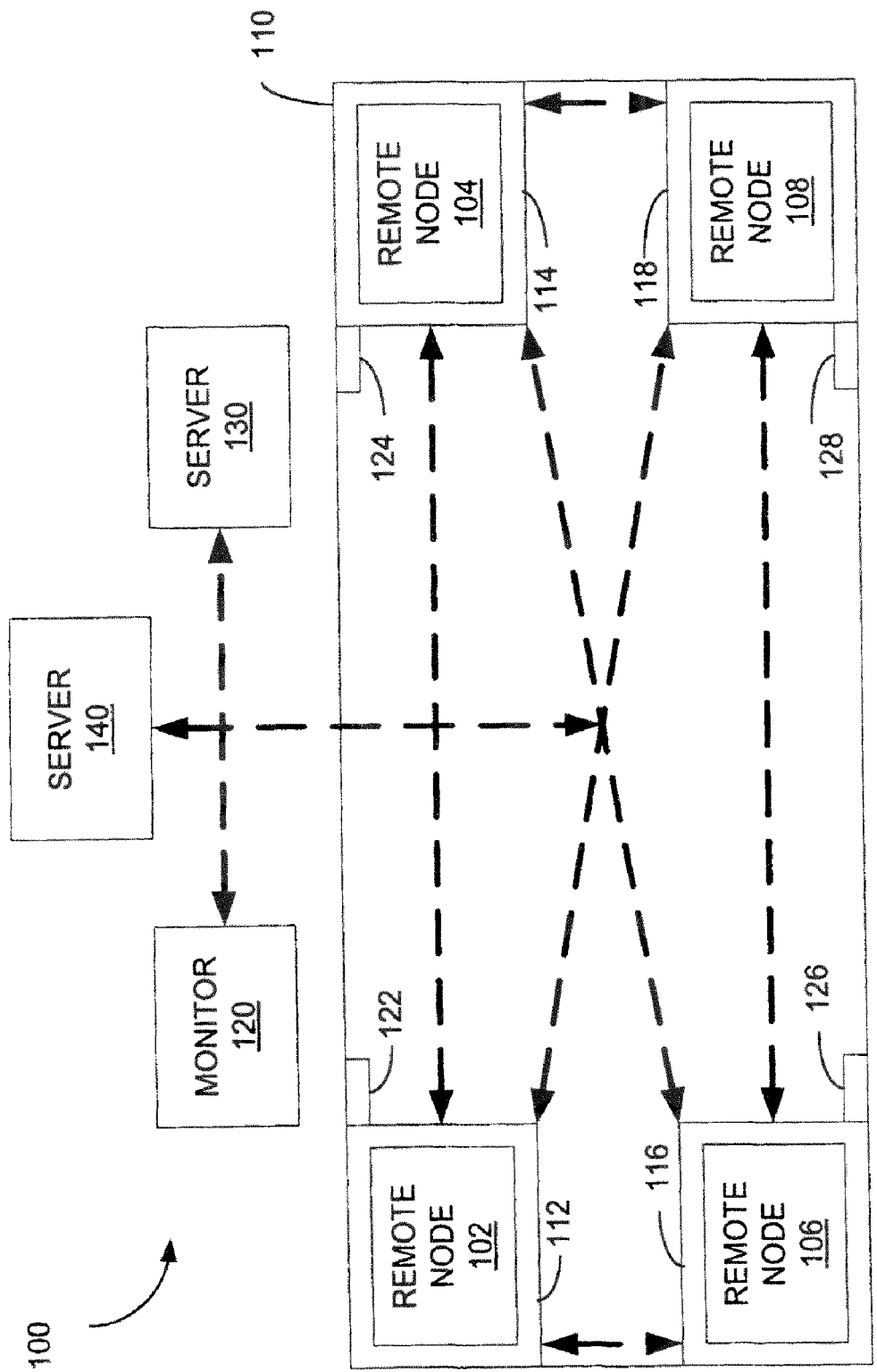
FIG. 1 is a block diagram of a secure detection system network, in accordance with the present invention.

A system and method in accordance with the present invention provide a secure network having interfaces to detectors configured to detect any of a number of undesired conditions. Such a system and method provide security for network nodes against attacks, whether intentional by an enemy or inadvertent by friendly forces. Such a system and method include a plurality of nodes configured to communicate in a highly secure and robust manner. Several of the nodes include or interface with one or more detectors, monitors, or sensing devices (collectively, "detectors") configured to sense the presence or introduction of an "illegal condition", such as suspicious materials or activities.

Generally, suspicious materials include any material of a nature such that, if detected, would present a reason to open a container and examine it. Such materials could include drugs, nuclear, chemical, biological or other hazardous materials, devices, compositions, or agents, or any weapons or agents of mass destruction, including nuclear weapons, explosives, chemical weapons, and biological weapons, as well as shielding material that would shield radiation, explosives or biological weapons from detection. Suspicious materials could also represent materials that were at variance with the materials that the shipper states are supposed to be in the container.

Generally, suspicious activities would involve detection of any activity such that, if detected, would represent a reason to open the container and examine it or to otherwise consider a formerly trusted asset as untrusted. Suspicious activity could include electromagnetic radiation, sonar, or heat variations, or removal or tampering with a detector or remote node. For example, removing a detector or remote node from a container might be indicative of an attack on a detector, node or container. The presence of human beings inside a container after the container had been closed and was ready for shipment would also constitute suspicious activities, or the presence of a human that has not been properly authenticated.

In the preferred form installation, authentication, and auditing of nodes and secure communication among the nodes is accomplished using the systems and methods disclosed in U.S. Pat. No. 6,067,582; U.S. Pat. No. 6,535,254 B1, and U.S. patent application Ser. No. 09/441,403, all of which are incorporated herein by reference (collectively describing the "Secure Network"). Such a Secure Network is also further described in Appendices A-G hereof.

As an overview, the Secure Network includes at least one server node that distributes intelligent agents (or agent modules) to devices, and any other software and data necessary to configure and enable the node. Each agent module is specific to the device to which it is distributed. A device properly configured with an agent module is referred to as a node. The node includes information received from the server node that identifies other nodes with which the agent's node is to communicate. Each pair of nodes that is configured to communicate will be configured with encryption means unique to that pair of nodes' communication, which may take the form of unique key pairs. These key pairs may be strobed to further enhance security. The agent module installs any applications or software distributed from the server node to the agent's node. The server node may also reinstall the network at any time, e.g., in response to loss of a node or a determination that a node has been compromised. Additionally, a monitor node can be included to audit a group of nodes.

In the case of human interaction with or auditing of a protected asset (e.g., a container) preferably authentication of the auditor is required. In such a case, the authentication could be provided, at least in part, using orthogonal authentication, i.e., at least two independent means of authentication. For example, a first means of authentication could be by entry of user ID and password. A second means of authentication could be by biometric information (or bioinfonmatics), such as a palm, hand, finger print, retina, or face scan. Orthogonal authentication is discussed in greater detail in Appendix B.

There are several exemplary scenarios in which the present invention may be implemented. In a first scenario, a wireless device or devices (i.e., "remote nodes") may be attached to or embedded in shipping containers. The remote nodes may couple by wired or wireless means to various detectors configured, for example, to detect weapons of mass destruction. The detectors can be located inside the container and distributed as needed to adequately perform their surveillance functions. The detectors can be packaged with remote nodes or external to the remote nodes. The remote nodes are queried by appropriate external monitor systems to determine if the nodes and detectors have sensed weapons of mass destruction or other contraband. One issue to be confronted in such a scenario is that an enemy might attempt to sabotage or reverse engineer the nodes so that they falsely report a safe status, so that the container would pass query by authorities. This scenario is referred to as the shipping container scenario.

In another scenario, wireless remote nodes may be attached to soldiers so that these nodes can be queried on the battlefield to determine whether a person is friend or foe. One issue here is that an enemy might capture the soldiers or the equipment and reverse engineer the wireless remote node, thereby allowing the enemy to masquerade as a friend. Conversely, friendly forces might mistakenly consider a soldier on the battlefield who cannot be authenticated to be the enemy and open fire. This scenario is referred to as the soldier scenario. In yet another scenario, wireless remote nodes may be attached to equipment such as tanks or airplanes. In such a case, the remote nodes can be queried on the battlefield to determine whether the vehicle is friend or foe. This scenario is referred to as the vehicle scenario.

In still another scenario, wireless remote nodes may be attached to individuals so that the individuals can gain authorized access to a building or an event. An issue to be confronted is that an enemy may capture an authorized individual, reverse engineer the remote node, and gain unauthorized admission. This scenario is referred to as the pass holder scenario.

In each scenario above, the wireless remote node passes through the following stages:
(1) A secure stage or stages, where the wireless remote node will be securely provided with cryptographic material.
(2) An insecure stage, where the wireless remote node will be subject to attack by an enemy.
(3) A stage where the wireless remote node will be able to detect an attack by an enemy.
(4) A stage where the wireless remote node will be queried by an external responsible agent (e.g., military or civilian authorities).

Provided in accordance with one aspect of the present invention, is the ability to detect in stage (4) if an enemy attack has occurred in stage (3). This goal could be achieved by providing in stage (4) a measure of the probability that an attack has or has not occurred in stage (3). An additional goal in the soldier and vehicle scenarios is to positively identify an unknown person or vehicle as friend or foe. Table 1 shows, for each scenario, a set of secure stages and a corresponding set of attack detection approaches, as examples.

TABLE 1

| Scenario | Secure Stages | Attack Detection |
| --- | --- | --- |
| Shipping Container | Manufacturing plant Shipping Line premises US Port US Controlled facilities | Several devices monitor one another inside the same container Several devices monitor one another across different containers Other sensors detect WMD Individual device senses attack agInst it |
| Soldier | Squad room before mission Presence of other soldiers or equipment during mission | Device attaches to body sensor |
| Military vehicle or airplane | Before takeoff or before mission For vehicle, in presence of other soldiers or equipment | Device attaches to sensors embedded in vehicle. Device attaches to body sensors or devices of occupants |
| Pass holder | From home via telephone. Company facility | Device attaches to body sensor |

Shipping Container Scenario. Each shipping container would contain one or more wireless remote nodes that is configured to communicate internally with one another and externally with other nodes. The remote nodes would include an interface to facilitate coupling to various sensors disposed to detect the presence of illegal conditions within the container. Such detectors could, for example, be embedded in or attached to the container, as could be the remote nodes. In addition to sensing the presence of illegal conditions, the sensors could be configured to detect access to the container, whether authorized or unauthorized. Illegal conditions could be the presence of any one or more of dangerous chemicals, biological agents or radioactive materials, explosives, drugs, or the like.

The shipping container will at various times be in facilities that are relatively secure, such as the manufacturing plant or a US Port or US controlled facility. At these times, the remote nodes can be securely provided with cryptographic materials via the Secure Network.

The wireless devices would detect an attack when they sensed prohibited substances or when an individual device sensed that it was being attacked. Several remote nodes could also continually monitor one another inside the container. Adjacent containers could also monitor one another.

Soldier Scenario. The soldier will have a wireless device connected to a body sensor. An attack will be sensed when reports from the body sensor indicate that something is amiss or when the body sensor is removed. A soldier can include a soldier, an airman or any person that formally participates in military missions. Prevention of friendly fire instances is an important goal of the soldier wireless device.

The soldier is in a relatively secure environment in the squad room before leaving for a mission and on the battlefield in the visual presence of other soldiers. At these times, the soldier can be provided with cryptographic material using Secure Network methodologies.

Military Vehicle or Airplane Scenario. The number of friendly fire instances in the Iraq war indicates the need for methods of securely identifying unknown vehicles and aircraft. The invention described herein can be used to assure identification of vehicles and airplanes over wireless. Of course, in practice on the battlefield, it will be extremely important to have a system that tests that the wireless identification systems are correctly operating immediately before a vehicle or airplane is put into combat.

Pass Holder Scenario. A pass holder is an individual who is authorized to enter a facility or attend an event. The pass holder carries a wireless device which is queried at the point of admission. The pass holder also has a body sensor, possibly a wrist band, to which the wireless device communicates. The wireless device records an alarm when the body sensor is removed or when the body sensor records some other event. The issue with the pass holder is to deliver the cryptographic material in a secure manner.

One possibility is for the pass holder to become authenticated at home before leaving for the event. The pass holder would put on the wrist band, and have the wireless device communicate with a remote authority via wireless or wired network and receive the cryptographic material and then undergo an authentication procedure using perhaps the telephone or a biometric device in his house. This system would allow a large number of individuals to be continually monitored over a large area. It could be combined with on-site biometric devices.

In the soldier and pass holder scenarios, a body sensor is attached to an individual, the individual is carrying a handheld device, and the handheld device talks to the body sensor. If the body sensor is removed or the body sensor detects a trauma, the handheld device records this event in such a way that the handheld device cannot be later reverse engineered to omit the detection of this event. The body sensor, the handheld device, and the installation of the Secure Network assures that when the system communicates with the handheld device it can determine whether the individual carrying the handheld is alive and can authentic him or her.

Before the individual goes to the battlefield or applies for admission to a facility or event, the individual must be properly set up with a body sensor and a handheld device in some secure and known environment. This could be an assembly of soldiers before being dispatched to the battlefield or some type of telephone verification or other procedure for pass holder admittance.

Once the individual has the body sensor and the handheld device, it is then necessary to locate the handheld device in three dimensional space. One technology for doing this is to detect individuals passing through fixed screening devices, and querying the handheld device. The screening devices would talk to the handheld devices through some appropriate interface. The fixed screening devices would be appropriate for perimeter protection and building access. As an example, a technology exists for communicating via florescent lights (see e.g. www.talkinglights.com). There is also a technology for illuminating devices with light and receiving a response via retroreflection. There are numerous developments of this technology. The point is that once an individual, equipped with the handheld and his or her body sensor, is located in three dimensional space, we can be assured that the individual is authentic and has not been replaced by the enemy.

This system of securely identifying individuals could be further expanded by developing a network of individuals with body sensors and handhelds inside vehicles which communicate via wireless with remote sensors. This could be used to form a network that would authenticate vehicles entering a facility by authenticating the vehicle and its passengers. There can be a problem of detecting a rogue unauthorized individual inside a vehicle which is analogous to finding a rogue container inside a container pile on a ship.

FIG. 1 is a block diagram of one embodiment of a secure detection system network in accordance with the present invention, applied to the shipping container scenario. In this embodiment, the secure detection system network implements the Secure Network in the context of protecting one or more shipping containers, such as shipping container 100. Such shipping containers can be transported by any number of means, e.g., ship, airplane, train, or truck. The secure detection system network includes remote nodes, monitors, and servers, and optionally robots, which all form nodes in the Secure Network.

A remote node, such as remote nodes 102, 104, 106, 108, includes a computer processor and storage having an agent module loaded thereon that causes the remote node to act as part of the Secure Network. In this embodiment, each remote node 102, 104, 106, 108 includes a wireless communication interface. The various communication paths are shown as wireless paths by dashed lines between the nodes. As shown, each node is configured to communicate with each other node, though it is not essential that this be the case. Also, the remote nodes are configured to communicate with at least one monitor 120, robot 130 (if included), and server 140.

Each remote node is coupled to a variety of detectors capable of detecting illegal conditions, such as atomic bombs, chemical and biological weapons, human beings and shielding materials. In FIG. 1, detector 122 is coupled to remote node 102, detector 124 is coupled to remote node 104, detector 126 is coupled to remote node 106, and detector 128 is coupled to remote node 108. Remote nodes 102, 104, 106, 108 are able to receive from the detectors signals indicative of the presence or occurrence of such illegal conditions with respect to container 100. Preferably, the detectors are also configured to detect the occurrence of suspicious activities directed against the remote nodes 102, 104, 106, 108, detectors 122, 124, 126, 128, or container 110.

Preferably, each remote node is housed within a tamper resistant box. Detectors may be included in the same box. Each remote node housed in tamper resistant box can be coupled to container 110 via brackets 112, 114, 116, 118. The set of detectors may also include detectors capable of detecting attacks against the tamper resistant box. Generally, the various detectors discussed herein are known in the art, so not disclosed in detail herein.

The phrase "tamper resistant", as used herein, refers to a structure that has been hardened against tampering, including reverse engineering, to the extent possible under the state of the art of relevant technologies. Such technologies can include physical measures and detection means, including electrical, magnetic, infrared, logical or other sensory means of protection or detection as well as software methods. The resistance to tampering can be increased by various strategies for deploying the nodes using the Secure Network. "Tamper evident" is considered to fall within the scope of the "tamper proof" or "tamper resistant" concept, in that the tamper resistant box may include means for detecting attempts by an enemy to tamper with it. Ideally, the tamper resistant box will detect tampering before the enemy realizes that the detection has been made. In this case, the box can also act as a decoy. Tamper proof refers to an ideal which, theoretically at least, is unattainable, thus use of "tamper resistant" is generally more accurate.

A robot 130 may optionally be included, and can take the form of a portable computer platform. The robot 130 could, for instance, take the form of a handheld device, remote controlled device, or preprogrammed mobile device. When included, the robot 130 forms part of the Secure Network and is configured as a monitor node. Accordingly, the robot 130 can perform auditing activity, such as counting and identifying containers that either do or do not contain remote nodes. For example, a robot could be deployed before entry and/or exit of a port.

As a node in the Secure Network, robot 130 executes an intelligent agent that configures the robot as a node capable of auditing other nodes in the Secure Network. In a wireless setting, robot 130 includes a wireless communication interface to enable communication with other wireless nodes in the Secure Network.

Like the remote nodes 102, 104, 106, 108, a robot 130 can be enclosed in its own tamper resistant box. In such a form, robot 130 includes detectors suitable for detecting attacks against its own tamper resistant box.

A monitor (or monitor node) 120 forms part of the Secure Network. Monitor node 120 includes a computer processor and storage, and is configured to host and run an intelligent agent capable of configuring the monitor, including installing any downloaded software and files. In the wireless setting, monitor 120 includes a wireless communication interface that enables it to communicate with various servers (e.g., server 140), other monitors, robots (e.g., robot 130) and remote nodes to perform auditing of the Secure Network.

The monitor node 120 may also be configured to detect suspicious activities directed against it. As with the robot and remote nodes, the monitor node 120 may also be enclosed in its own tamper resistant box. If housed within a tamper resistant box, monitor node 120 may also be configured to couple to detectors capable of detecting attacks against the tamper resistant box. Unlike remote nodes 102, 104, 106, 108, the monitor node 120 does not directly couple to container detectors, unless required as part of its auditing function. Rather, the monitor node 120 provides an auditing function with respect to the remote nodes 102, 104, 106, 108 themselves, and can also be configured to audit other nodes within the Secure Network. Therefore, the monitor node 120 can receive and process data from remote nodes indicating an illegal condition or attempt to compromise the Secure Network.

Secure Network server 140 is a computer, possibly located inside a secure United States government facility or a security management facility, which provides overall management of the Secure Network. The Secure Network server 140 is configured to generate software and data files, including initial encryption keys, for each remote node and monitor node. The software and data files (and encryption keys) are specifically generated for each node. Each node can be given an IP address, which provides a means for the Secure Network server 140 to access the nodes via, for example, the Internet and to distribute the corresponding intelligent agent modules (or agents), software and files to each node. For a given node the agent installs the software and files, allowing the node to enter the Secure Network. In the event that the Secure Network server 140 is housed within a tamper resistant box, then the Secure Network server may also include detectors capable of detecting attacks against the tamper resistant box.

In the preferred embodiment, the present invention enables an "active defense". An "active defense" presumably goes beyond preventing an act that is already underway but either prevents other attacks from occurring or at least identifies a specific attack very early on, before the enemy knows it has been discovered. An active defense contemplates the possibility of capturing or destroying the attackers, including persons who are planning or managing the attack. Monitoring attempts to attack Secure Network nodes provides an active defense.

Figure 2:
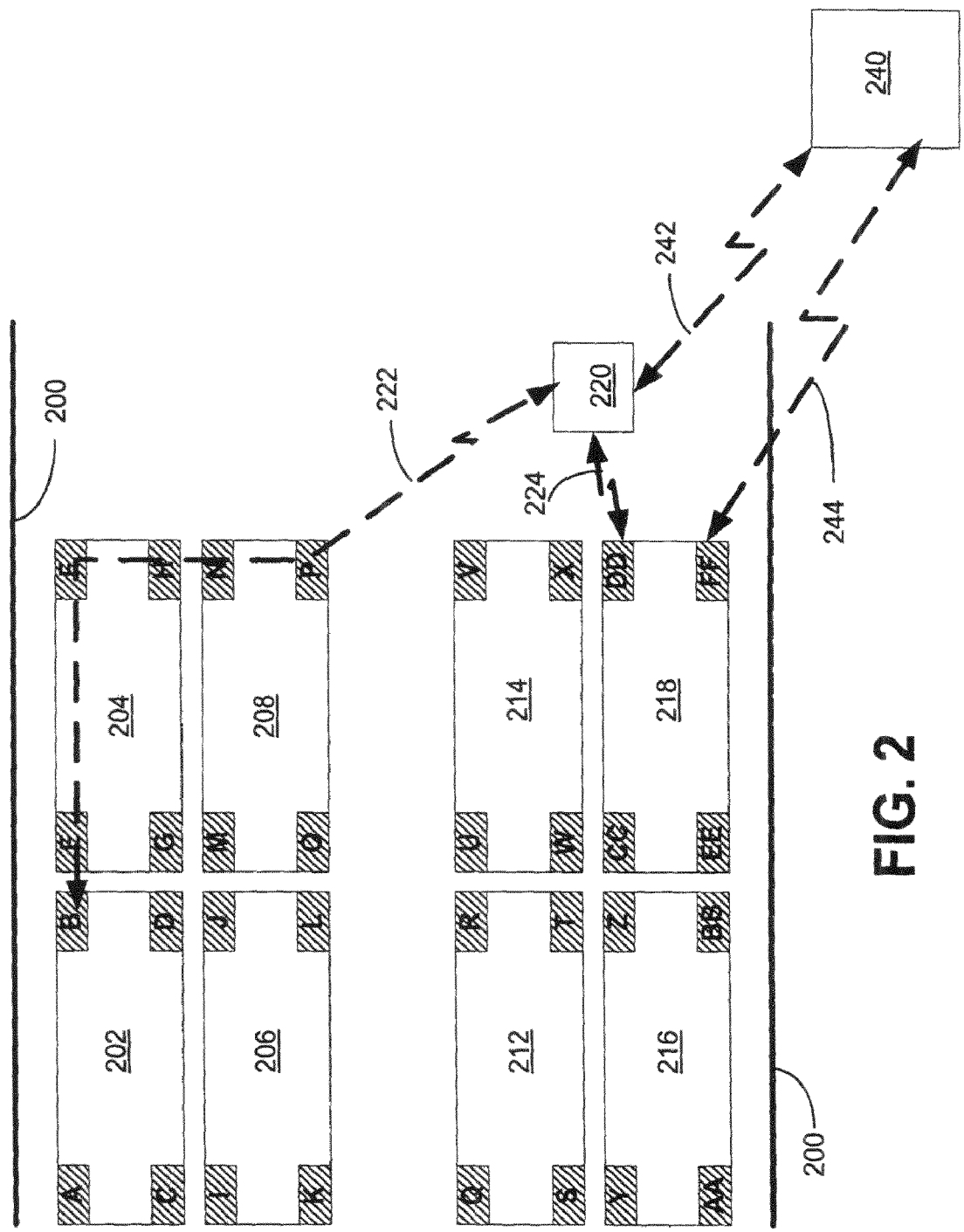
FIG. 2 is a block diagram of a portion of the block diagram of FIG. 1, with a plurality of containers.

As is shown in FIG. 2, a plurality of, if not all, shipping containers on a single vessel could include some number of remote nodes. The presence of one or more remote nodes in each container being shipped in a vessel could be made a condition for that vessel entering US Ports (e.g., where the vessel is a ship) or crossing a US border (e.g., where the container is being transported on a truck body or by rail). In FIG. 2, eight containers are shown loaded on a vessel 200. For a first set of containers, container 202 includes remote nodes A-D, container 204 includes remote nodes E-H, container 206 includes remote nodes I-L, and container 208 includes nodes M-P. For a second set of containers, container 212 includes remote nodes Q-T, container 214 includes remote nodes U-X, container 216 includes remote nodes Y-BB, and container 218 includes nodes CC-FF.

The containers can be examined efficiently by the onboard monitor 220 through communication with the remote nodes of each container, while the container is in transit from the foreign point of origin. Such monitoring can determine if any of the containers are storing suspicious materials or are the target of suspicious activities. The remote nodes report to and can be queried by either monitors or servers. The communication path between a remote node and monitor 220 can be direct or via other remote nodes. And the path between remote nodes and server 240 can be direct or via other nodes.

For example, path 222 shows that remote node B can communicate with monitor node 220 via remote nodes E-F-H-N-P. This path can be continued to server 240 via path 242, thereby establishing a path between remote node B and server 240, via remote nodes E-F-H-N-P and monitor 220. Of course, path 242 could also represent communications between monitor 220 and server 240, independent of communications from any remote nodes. Other paths may also be formed for remote node B to communicate with monitor 220. As an example of direct communications, remote node DD is shown communicating directly with monitor 220 via path 224. FIG. 2 also illustrates how a remote node can communicate directly with a server, here remote node FF communicates directly with server 240 via path 244.

Figure 3:
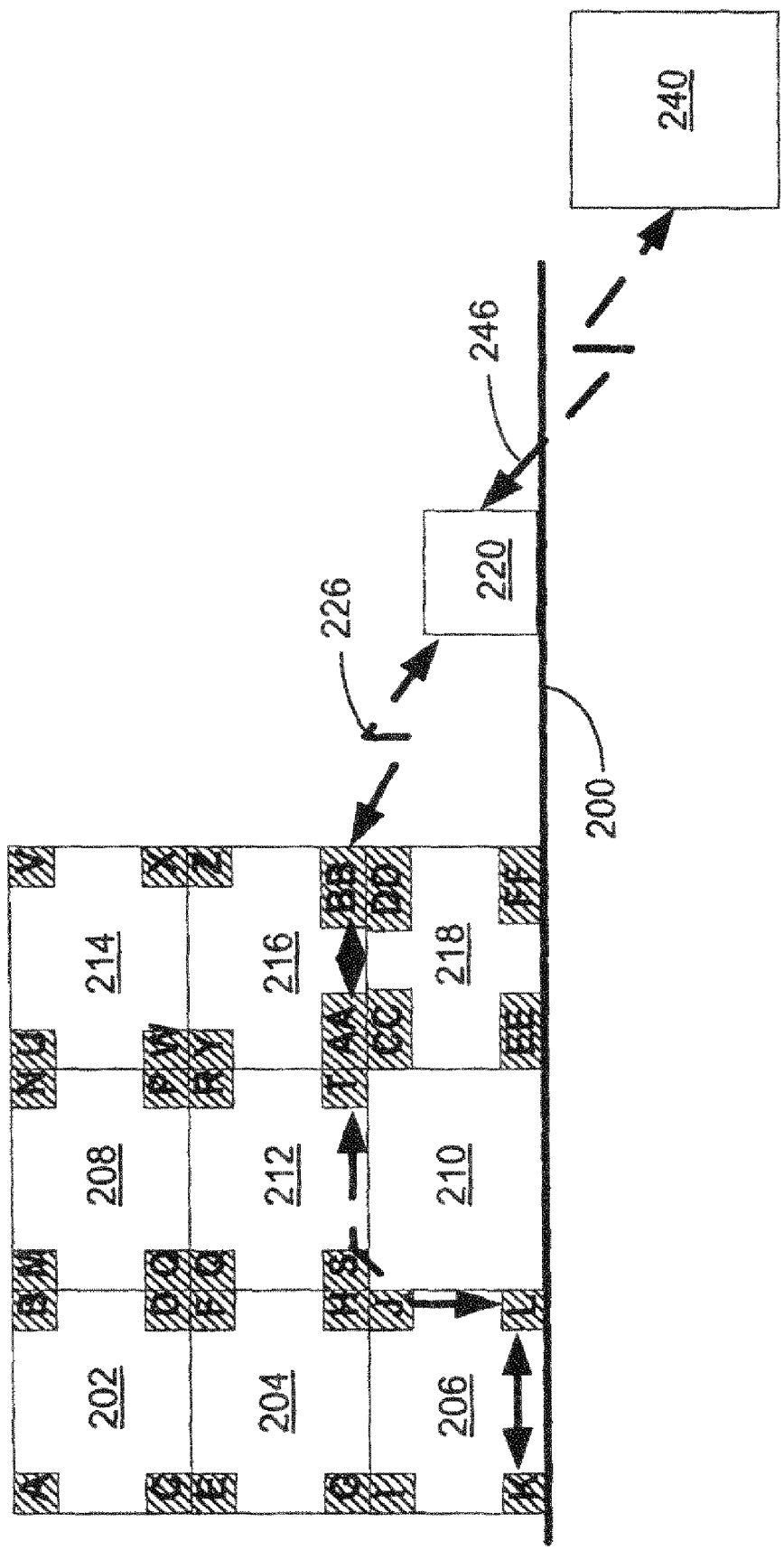
FIG. 3 is a block diagram of a portion of the block diagram of FIG. 1, with a plurality of containers in a stacked configuration.

FIG. 3 shows yet another configuration of containers on vessel 200. This is a stacked configuration. In a stacked configuration, it can be difficult to maintain a wireless path between each remote node and the monitor node 220, server node 240 and, if provided, a robot (not shown). Also, there may be instances where not every container in the stack includes a remote node. For instance, in FIG. 3, container 210 does not include a remote node. As an example, a communication path between remote node K of container 206 would likely not be a direct path, since container 206 is buried in the stack. Therefore, the path may have to go through other intermediate remote nodes, while avoiding container 210. Accordingly the path between remote node K and monitor node 220 include nodes L-J-S-T-AA-BB. Other paths could also be formed. To communicate with server 240, the path may also include path 246 between monitor 220 and server 240.

Through querying various remote nodes of containers, containers that do not contain remote nodes can be readily identified by monitor 220 or a robot prior to the ship arriving at its port (e.g., a US port) or the truck or train arriving at a border (e.g., a US border). Shipping containers loaded on a ship can be examined while loading through an intermediary of a monitor 220 and after loading through the intermediary of a robot.

The present invention addresses the problem of inserting detection devices into shipping containers in such a way that a determined, sophisticated enemy cannot defeat the system. In the foregoing figures, detectors and remote nodes are provided at the container. However, no doubt, there will a number of potential strategies for defeating the insertion of detectors and nodes which detect suspicious materials and activities as described above. Such potential enemy strategies may include:

1. Shield the suspicious materials or activities from the detectors.
2. Defeat the communication interface so that the interface does not report evidence of suspicious materials or activities reported by the detectors.
3. Disconnect the detecting devices from the interface.
4. Surreptitiously load a container that contains an atomic weapon but that does not contain detecting devices onto a container ship.
5. Overcome the monitors so that they incorrectly report on the status of the devices.

The difficult aspect of the environment is that the detectors, nodes and the communications interface will be in the hands of the potential enemy for some period of time, at least for the period of time necessary to load the container. Also, since the potential enemy is presumed capable of constructing an atomic weapon, the enemy must be presumed able to utilize other advanced technologies suitable for defeating the detectors, remote nodes and interface. Also, if the enemy is conspiring with a disloyal employee of the shipping company, the monitors and the robots could fall into enemy hands.

Of course, there are some advantages potentially available to the side providing the detectors, remote nodes and interface (i.e., the defenders). For example, potential strategies and advantages for defenders include:

1. Defenders can limit the time the detectors, remote nodes and the interface are in the hands of the enemy, thereby limiting the time available to reverse engineer the detectors or the nodes.
2. Defenders will understand the defensive systems better than the enemy. Defenders can maximize this advantage by making the defensive terrain more difficult to understand, and by not repeating the same defensive terrain.

This means that reverse engineering one interface will not necessarily be helpful for reverse engineering the next.

3. Defenders can maintain important parts of the system physically secure from the adversary.
4. Defenders can harden the physical protection around the interface.
5. Defenders can use detecting devices which detect not only suspicious material but also attacks against the communication interface.
6. Defenders can use multiple communications interfaces and detectors, which can continuously monitor one another, so that if one is attacked one of the others can report the attack or shut the system down.
7. Defenders have many opportunities to test the system.
8. Defenders have many opportunities to employ robots which can be externally controlled from remote secure locations.
9. Defenders have the ability to continuously monitor each remote node from the moment a shipper begins loading the container until the container arrives at its final destination.
10. Defenders have the opportunity to mount an active defense such that an enemy can be detected before the enemy realizes it has been detected, thereby allowing the defenders to perform to covert surveillance of the enemy's infrastructure.
11. Defenders can implement orthogonality to significantly reduce the possibility of imposters gaining access to containers, detectors, remote nodes, monitors, or robots.
12. Defenders can use a secure stage during which they can configure the battle terrain to the defenders' advantage.

A secure detection system network in accordance with the present invention is particularly suited to maximizing these advantages for the defenders. The capabilities provided by such a system which are relevant to maximizing the above strategic advantages for the defenders are discussed below.

Generating network components, rapidly installing these components, and auditing the components immediately after installation provides a great deal of security. This generation/installation/audit capability can be utilized to limit the time a remote node is in the hands of an adversary, since this process is so highly automated, and the ability to dynamically configure the remote node presents unknown terrain to a potential attacker.

Strobed encryption allows for exchanging encryption keys every few seconds between nodes in the Secure Network. This capability can be exploited by constructing a system of nodes so that they can all strobe with one another and each can check on whether the other is being attacked. This makes reverse engineering more difficult because the target is continuously changing encryption keys. In this context, if the information is communicated outside to monitor nodes, information previously sent, even if it could be decrypted, is almost useless to a potential enemy. So, breaking one key does not help break the next. The time advantage between detection of an attack and an enemy's realization that detection has occurred represents an opportunity to mount a defense aimed at penetrating an enemy's infrastructure.

The Secure Network can be used to rapidly configure ad hoc networks such that several remote nodes inside a container can be securely linked to one another and to other nodes such as, (a) to a shipboard monitor which will monitor the remote nodes in all of the containers on board, (b) to possibly a monitor which will communicate with the remote nodes while the container is being loaded by the adversary, (c) to possibly nodes in other containers, and (d) to possibly a robot which will count the containers before the ship is ready to leave port.

One possible application of this embodiment of the present invention is discussed below. We will assume the following organizations are involved: (a) a US Coast Guard Control organization located in the United States in a secure location; (b) a shipping company, located in a foreign country, which is known to and certified by the Coast Guard; and (c) a shipper (or seller/distributor) who will load the container with merchandise (or cargo). We assume that the shipper is hostile. We assume that the shipping company is disposed to be cooperative, that is, the shipping company is a substantial, recognized business which has a strong financial incentive to prevent a nuclear attack on the United States perpetrated through the intermediary of one of its containers. However, we may assume that the shipping company has some disloyal employees who personally are hostile to the United States.

We will assume a requirement that a container that does not contain an approved secure detection system is not allowed to enter the United States. Shipping companies who refuse to comply would not be allowed to ship containers into the United States, whether through US ports or across US borders. Shipping companies who want to comply will register with the US Coast Guard for example. As a precondition of being allowed to register, they would agree to undergo a background check, the simplicity or intensity of which would vary company by company.

A description of how the system could operate under this scenario is as follows. The remote nodes and monitors are provided to shipping companies. The remote nodes and monitors are manufactured and delivered in a tamper-resistant state for installation in containers bound for the United States. The remote node could include the detectors within its tamper resistant box. The nodes could come in different classes, depending upon the type of detectors with which the remote node is configured to interface. The class, nature, type, quantity, and capabilities of the detectors configured to couple to a remote node should remain classified and known only to the server node.

The shipper orders one or more containers. For example, the shipper needs a container to ship a particular product to the United States. The shipper arranges with the shipping company for delivery of a container to the location where the shipper will load the container. The shipper and shipping company agree on details such as the size of container desired, when the container will be delivered, the contents of the container, when the container will be ready for pickup, destination, likely weight and so forth.

The shipping company enters an order with Coast Guard. The shipping company is registered with, for example, a container control system established by the Coast Guard. Using a computer and communicating via the Internet, the shipping company connects to the Secure Network server node and inputs the appropriate information regarding the request for a container received from the shipper.

The shipping company initializes remote nodes and monitors to be used by the shipper via the Secure Network server. For example, on the day the container is to be dispatched to the shipper, the shipping company assigns a separate IP address to each of some number of remote nodes, perhaps four, and a monitor node, and also assigns a receptacle number to each remote node assigned to the container.

The server node identifies the remote nodes that should be placed in the designated container based on the nature of the cargo to be shipped, the remote nodes known to be in the inventory of the shipping company, and other factors such as, perhaps, the reputation of the shipper, the country of origin, and so forth.

A shipping company employee then couples the remote nodes and monitor node to the Internet, enters the respective IP addresses and receptacle number for each remote node and requests initialization from the server.

The server generates software and data files necessary to securely network the remote nodes and one or more monitors with the server into a Secure Network, as previously discussed. Additional random procedures can be introduced into the software so that no two remote nodes or systems will appear identical to an enemy attempting to reverse engineer them. The server will also randomly generate initial keys for use when the remote nodes or monitors connect with one another via the Secure Network.

The server will query each of the remote nodes and monitors to check system integrity. The remote nodes and monitor will all have serial numbers in their processors, which previously will have been registered with the server. The server will then automatically download and install software on the remote nodes and monitors which are still in the shipping company's possession or control. When the installation is complete, the remote nodes and the monitors will connect to one another, and immediately begin strobing the encryption keys used between each pair to exchange messages. Strobing is discussed in detail in Appendix G.

The shipping company can perform an orthogonal audit, as more fully described in the Appendicies hereof. The installation can, for example, be orthogonally authenticated perhaps by the server's downloading a randomly generated number to be displayed on the screen of shipping company's office computer and then by placing a telephone call to shipping company's office and having the number on the screen entered through the telephone key pad.

The authentication is valid even if the shipping company employee supervising the installation is personally hostile to the United States or is working for an enemy. This auditing procedure is in conformity with the methods disclosed to audit a node after installation in the Secure Network.

The shipping company installs remote nodes in the container, preferably in numbered, tamper resistant receptacles, perhaps in the four diagonal corners of the container and delivers the container to the shipper. It would be appropriate to perform another auditing procedure when the remote nodes have been inserted into their appropriate receptacles. The four remote nodes will continue to send messages to one another and to strobe encryption keys with one another. The remote nodes optimally will also remain in contact with a monitor, which can remain in the shipping company's control, and which will remain in contact with the server.

An optimal configuration would enable any remote nodes to detect attempts to tamper with it or to remove it from the receptacle into which it has been placed. Any suspected tampering could be detected by the remote node and communicated to other remote nodes or to the monitor or monitors to which the remote nodes are connected.

The shipping company then delivers the container to the shipper. The remote nodes and detectors are installed and the remote nodes continue communicating with one another and with a monitor in the shipping company office. The remote nodes should remain connected to a power source. If they are disconnected from the power source this will represent a system violation. As an example, the remote nodes could use some type of a rechargeable battery. Containers provided with power sources have been used in global commerce for many years. These power sources could also provide power for remote nodes.

The shipper loads the cargo into the container. This is a vulnerable situation because the remote nodes are potentially under the control of the enemy at this time and must withstand attacks designed to destroy, deceive, or reverse engineer them. However, if any remote node can detect tampering, it will communicate with the monitor and could be shut down. If tampering is detected, the container will preferably not be loaded on the ship without human inspection, and the matter should escalate so that appropriate police, military, and forensic activities can be initiated with the objective of capturing and prosecuting the persons who performed the tampering.

However, if the tampering can be detected without the shipper being aware that it has been detected, additional measures may be appropriate, namely the provision of additional surveillance and intelligence resources at the site where the container is being loaded and conceivably at the site where the ship will be loaded and at the offices of the shipping company. This would represent an active defense strategy.

Depending on cost and available technology it would be possible to install various scanning devices in the remote nodes so that the loading of the container could be viewed and monitored. These devices could be important sources of intelligence.

Once the container has been loaded and locked by the shipper, it will be picked up by the shipping company, delivered to the port of departure and then loaded onto the ship.

Prior to loading the monitor will communicate with the remote nodes in the container, and verify (a) that the remote nodes are in place and have not been tampered with and (b) that they have not detected suspicious materials or suspicious activities. Software on the monitor can also compare the weight of the presumed cargo of the container, and the actual weight of the container. Containers that exceed their expected weights by some predetermined amount will be subject to opening and visual inspection.

If included, a robot can be tasked to examine the ship before departure. After the ship is loaded and immediately before departure the robot will traverse the ship to inspect each object that could be a container, and verify that each such object is a container equipped with appropriate remote nodes.

The purpose of the robot is to avoid a situation where terrorists, working in concert with port employees and or employees of the shipper, somehow smuggle an additional rogue container on board. Since this rogue container would not have any remote nodes inside, there would be no way for the monitor to know it is on board or what is inside it.

Prior to departure, the shipping company can install the monitor node in a tamper-resistant holder on the ship. The monitor will communicate with at least one remote node in each container and remain in contact with each container throughout the voyage to the United States. At the same time, the monitor onboard the ship will communicate with the robot (if any), and obtain a count of the number of containers on the ship and a report as to the existence of any containers on the ship that lack remote nodes. Containers lacking remote nodes can be unloaded from the ship and refused shipment until they have been opened and inspected by the shipping company and the port authority. If they are determined to be legitimate containers, the shipping company will install properly authenticated remote nodes before permitting the containers to be sealed and shipped.

After performing the inspection, the robot can be removed from the ship, reinitialized, and be used to inspect the containers on another ship.

A robot can also be used to examine a ship before entry into a US port. When the ship reaches the US port, the Coast Guard will be able to communicate with the monitor on board the ship and will be able to verify that the ship is composed entirely of containers with remote nodes and that no sensor has detected improper materials. The robot could also re-examine the ship to determine that all containers have remote nodes, that is, that a rogue container has not been loaded on board during the voyage.

One method might be to have a robot that remains on board the ship. The robot could be reinitialized automatically and could perform its inspection without the ship having to be boarded by the Coast Guard. A second method is for the Coast Guard to board the ship and bring a robot with them. The robot would be initialized as a node and authenticated when it was on board the ship.

A shipping company could already have appropriate robots or controls on board so that the functions performed by an robot could be performed by controls already on board the ship. In this case, it would be appropriate to integrate the monitor with on board system controls in an appropriately secure manner.

If any remote nodes have found suspicious materials, the corresponding containers would need to be inspected. Containers without remote nodes, or with remote nodes that have ceased to function, will need to be inspected.

In cases where a ship uses holds to store loose cargo, one or more remote nodes could be placed inside such holds. The hold could be treated as a container. The hold is typically bigger than a container, although individual items of cargo in the hold are usually smaller than items loaded into a container, and, therefore, would generally be less capable of providing shielding against detection of suspicious materials.

Containers seeking to enter the US by truck or by rail can be held to the same requirements. That is, they could be required to contain remote nodes which could be examined by a monitor prior to being permitted US entry.

The remote nodes can be manufactured and shipped to include detectors in their tamper resistant containers. What detectors are actually located in a specific remote node should remain highly classified, since that information would aid those interested in defeating the nodes. The detectors that are introduced into any specific container should depend on the cargo that the shippers claim will be shipped. The decision as to which remote nodes should be installed into a container should be made by the server based on information which only it has.

Given a specific set of detectors in a remote node, the values which the detectors will look for should be dynamically configured by the server immediately before the container is shipped. This is essentially an arms race, wherein as the enemy becomes more sophisticated in ways of shielding bombs the detectors are improved to overcome the shielding. It is assumed that whatever the current state of detection and shield technology, that detection can be improved by getting detectors inside the container. Also, deploying an inside-the-container detection system provides an additional layer of protection that augments and backs up whatever detection is possible from satellites or other out-of-the-container scanning methods.

To the extent that these detectors could be mounted on chips and built into a circuit board, more detectors could be deployed more inexpensively. Indeed, there is some discussion in the literature as to the need for scanning large areas of the earth with broad area passive sensors and then focusing on potential targets with narrowly focused active sensors. Presumably, if one could get close enough to the potential target, the need for broad area sensors would be lessened and the detecting ability of more narrowly focused sensors would be greater.

For example, considerable protection could be achieved if each remote node contained one or more Geiger counters and/or other detectors and possibly a way of detecting if the remote node were moved from its brackets. Just beating this system would require time and design on the part of potential enemies. Buying time is important because in the meanwhile perhaps the bomb manufacturing plant could be discovered and destroyed. Perhaps better sensors could be developed which could then defeat any improved shielding the enemy had developed. In any event, the Secure Network provides a significantly higher degree of security than might otherwise be available One of the strategies of the secure detection system is to limit the ability of the enemy to experiment with the detectors. A second, somewhat related strategy, is to detect an attack on the remote nodes before the enemy knows that it has been detected, thereby pinpointing the existence and location of enemy facilities. It is possible using a system that includes the Secure Network with detectors to detect attempted enemy attack before the enemy knows that his attack is detected. This actually represents an active defense.

Detecting an enemy attack before the enemy is aware that the attack has been detected has many important possibilities, such as militarily raiding the location where the container is being loaded, adding additional intelligence gathering capability to that particular site and so forth. Of course a shipper who attempts to attack a remote node or to surreptitiously ship weapons should not again be allowed to ship containers to the United States.

The detecting strategy can be improved to correspond to the cargo which the shipper claims will be present. The system proposed in this invention is particularly well suited to dynamically modifying the detection strategy to suit the proposed cargo. In the first place, the decision as which remote nodes are selected to be included in the container can be dynamically made, by the server, at the moment the remote nodes are prepared for subsequent insertion in the container. Secondly, the detection strategy that will be used by the remote nodes, given a specific set of detectors, can be dynamically configured at this moment. The selection of the remote nodes and detectors, and the configuration of the detection strategies, can be made on the basis of information available only to the server.

Certain cargoes might be of such a nature that it would be impossible to determine whether a bomb was hidden inside, in which case these cargoes would require manual inspection. Examples of such cargoes could be the legitimate shipment of nuclear materials or legitimate shipment of nuclear shielding materials.

It is also potentially important to assure that the detectors remain located at both ends of the container rather than, say, being moved to one corner. But, this can be a function of the detectors' range and density of the cargo loaded in the container. The detectors may be located in the same box as the remote nodes, or in other embodiments detectors could external to whatever box holds the remote nodes. There are a variety of methods of determining where the remote nodes are in the container and also of detecting any attempts to relocate them while under the control of the shipper. However, it is important to detect movement of the remote nodes from their original position. In the first place, movement of the detectors can be evidence of an attempt to attack the remote nodes, particularly when they are in the same tamper resistant box.

Secondly, movement of the remote nodes may impair the ability of any enclosed detectors to detect suspicious materials.

The present invention is structured so that actions taken by human beings can be independently verified by other means. Since the system does not rely on any human action that cannot be separately verified it can therefore be orthogonally secure.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

APPENDIX A

Secure Network & System Overview

A Secure Network in accordance with the present invention is composed of nodes, which can be objects that run as threads and which are capable of securely connecting to other nodes and of interfacing to a wide variety of other computer executables and libraries running on Windows or UNIX.

Strobed encryption is the procedure for dynamically changing encryption keys every 30 to 60 seconds, for example. The details of one implementation of strobed encryption are provided in Appendix G. The parties begin with randomly generated startup or initial keys, which are hidden from everyone, including the parties themselves. By contrast, key exchange protocols such as EKE or kerberos, start with only a remembered password and have no mechanism for changing keys during a particular session. Strobed encryption in accordance with the present invention depends on other technologies of the Secure Network, such as automatic network generation, automatic installation, orthogonal authentication (see Appendix B) and audit, and data packaging (see Appendix C). The Secure Network uses only encryption primitives that are public, standard, and tested. New encryption primitives can be added as they become available.

Packaging, as used in the Secure Network, is an object-oriented framework for creating and compressing packages suitable for use over TCP/IP. The packaging framework include an Item class, which allows derived objects to model virtual any data format, and to apply compression on a field by field basis. Items and packages can be inserted into and extracted from packages and packages can be inserted into warehouses, which are disk resident files. The Secure Network uses its packaging methodology for general data transport and for storage and transport of encryption keys.

The Secure Network has a network generation program, which automatically generates configuration information needed to install a node. This program randomly generates the startup keys for all nodes. These keys will strobe immediately after the first connection. The network generation program also builds the executables and dynamically embeds randomly generated keys into the executables See Appendix D.

The Secure Network has an installation procedure which permits automatic installation of an entire network or parts of a network and allows for orthogonal audit and authentication of every network node, discussed in Appendix E.

Nodes in the Secure Network connect to other nodes using TCP/IP. Nodes can directly connect to some arbitrary number of nodes. By connecting nodes going through intermediate hops, an arbitrarily large Secure Network can be constructed. As an example, the node can be modeled in C++ as a class derived from an node thread class. The node class is inserted into an executable or a COM object by means of a pointer. The node class has an embedded package, and this package contains the information generated by the generator which allows the node to connect to other nodes.

Figure 4:
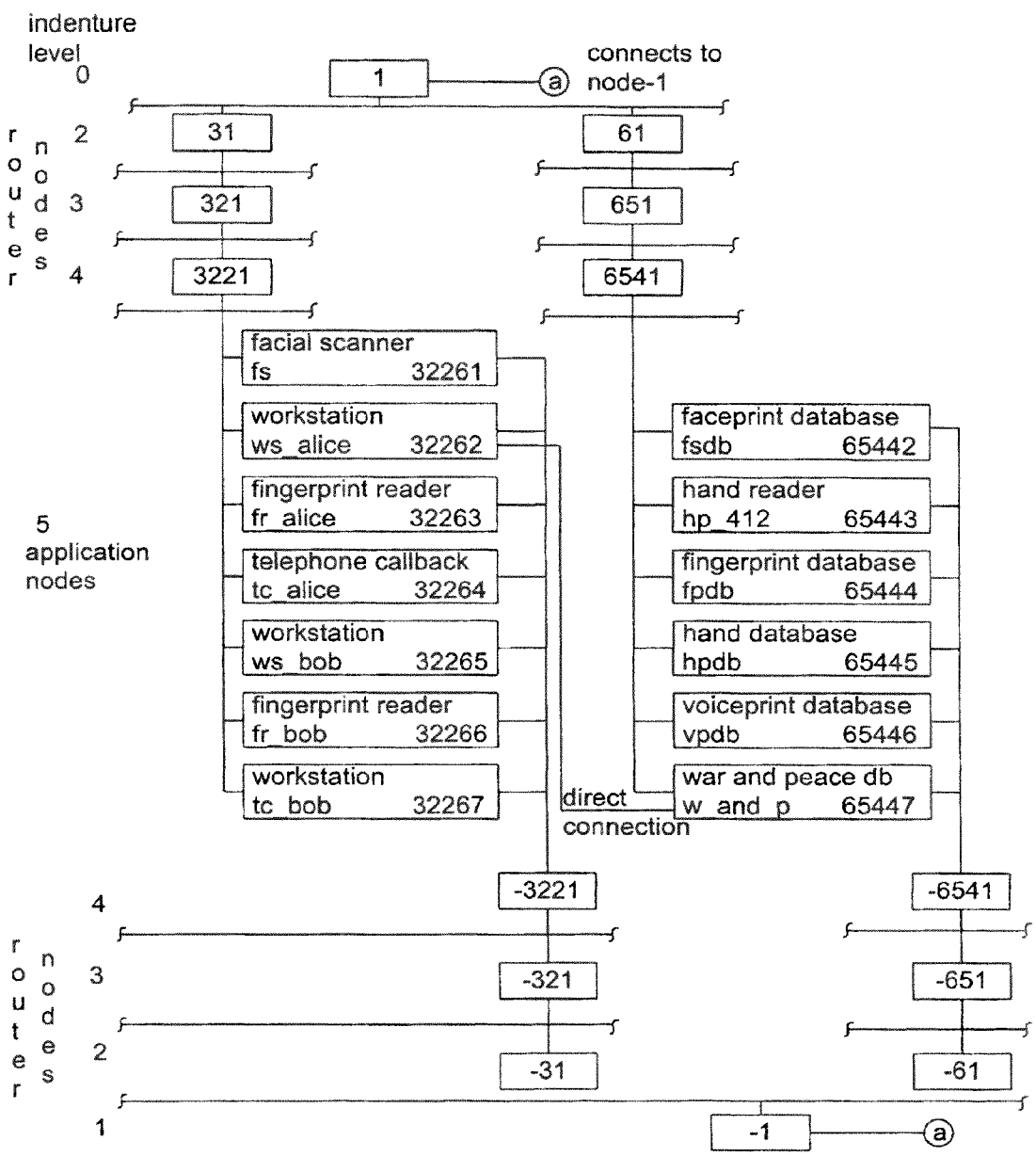
FIG. 4 is a block diagram of a massively scalable Secure Network, in accordance with the present invention.

The process that manages a node can do other things. For example, database servers can be nodes. A process that runs a browser can be a node. Intermediary routers that are used in a massive Secure Network can be nodes. (See Appendix F). The network diagram of the massively scalable Secure Network (see FIG. 4) shows some 27 different nodes. Each node has a different number, which is located in the lower right hand corner of the box on the diagram.

The server has a generator program, which, using a template, supplies all of the values needed for the various nodes in a Secure Network to connect to one another. The formal, exact definition of a node is that a node is an object created by the generator, which has the characteristic of being able to connect to other nodes. To define the relationship between a process and a node, at least one process is required to manage a node. Although, a process could manage more than one node.

There appear to be three unstated implicit assumptions in the present security system practice and the current security literature that are not followed in the Secure Network system. These assumptions are (1) that one cannot look to verify the identity of the other side; (2) that one cannot frequently reinstall the network; and (3) that one cannot frequently rebuild the network or the software. It would appear that these assumption have constrained approaches to the security problem so as to make the solution more, rather than less, difficult. Usually, of course, constraining a problem leads more readily to a solution, but in this case it appears to be the other way around.

Assumption One: No looking. The first assumption is that, when authenticating humans, one cannot go and "look" to see and verify the identity of the person at the other end of the connection. Using orthogonality the Secure Network system goes and "looks" (using biometrics, physical facilities, human audit, telephones, cross checking with other databases, and business procedures) to "see" that the person on the other end of the connection is actually who he/she claims to be.

Corollary to Assumption One; Only verify once per day. There appears to be a corollary to the "no looking" assumption, i.e. that once you have verified the person on the other side, it would be unseemly to verify her again, at least that same day. As we have indicated, Secure Network system is capable of (and interested in) verifying that person's identity many times per day.

Assumption Two: No reinstallations. Assumption two, which the Secure Network does not accept, is that installation is something that happened in the past and will not happen again for many months. Since the procedure can be automated and because it is easy to accomplish, the Secure Network is designed on the principle that critical applications will be installed and orthogonally authenticated frequently, e.g., every morning. The principles of the orthogonal authentication have been outlined herein, as have the principles of automatic installation.

It may be argued that reinstalling critical applications would overtax corporate computing resources. However, a large organization typically will have most of its employees working during a single daytime shift, and it will have computers available to support that work during that shift. During off-shift hours, under this assumption, unused computing resources are idle. The Secure Network can install a crucial application in a few seconds, so there is no significant impact to a large network.

It may be argued that daily reinstallation would be expensive. However, automatic reinstallation every morning saves organizations time and money. Conversely, manual installation is an inconvenient, time consuming, expensive, insecure, and error prone process. A new manual installation is usually required for each new client for a major system. A manual installation might cost, for example, $10,000 for a system installed in a foreign country. By assuming that all critical systems will always be automatically installed, a company would eliminate ever doing a manual installation, and thereby avoid the costs of manual installations.

Another important aspect of machine generated automatic installation of applications is that it takes installation out of the hands of system administrators, who, if they are corrupt, may install software which is not allowed. While reinstalling, the Secure Network installation procedure will destroy possibly infected examples of its own software. While reinstalling, the Secure Network will check for other examples of unauthorized software.

Assumption Three: No rebuilding. A final assumption, not accepted by the Secure Network, is that the code build and network configuration is something which happened in the past and will not happen again for many months. If frequently reinstalling, the software and network can be rebuilt at the same time. The advantage of rebuilding is that the Secure Network can randomly generate new keys and embed these keys in the executables. Also, the Secure Network can build new network connections, so can randomly generate keys for each connection, and randomly change IP addresses.

As long as rebuilding, it would be appropriate to check the source code for hidden back doors, and to verify that the source code has not changed.

One effect on system design of abandoning these assumptions, i.e., one cannot verify identity by "looking" and can not reinstall or rebuild executables and networks daily, is that there is no need for digital certificates. By eliminating these assumptions, the Secure Network is able to provide each node pair with starting session keys and one-time pads in each direction. A one-time pad is advantageous because it requires only an XOR to encrypt, which means that encryption is very fast. After the initial startup, the Secure Network immediately changes all of these keys through strobed encryption.

APPENDIX B

Orthogonal Authentication

Orthogonal authentication as implemented within the context of the Secure Network strengthens security by requiring multiple inputs from unrelated sources as a constant check on security decisions. Orthogonal authentication also eliminates the need for digital certificates and extends security procedures into the machine layer so as to mitigate the potential failings of human guards.

As an example, the problem that digital certificates are designed to solve is to determine whether the person on the other end of the connection is Alice or some imposter such as Eve. Assume that Alice is a person with sufficient authority to access computer networks that would enable her, if she were so inclined, to perform some devastating action, such as crashing a NASA mission, siphoning off enough money to put a bank out of business, releasing nuclear materials to terrorists or loading weapons of mass destruction into a container. If we know Alice well, and we do want to know Alice well or else we will not admit her to our network, we find that she has many characteristics that can be verified. Alice works somewhere, for example in Building 302 in Acme Complex in Anytown, AnyCountry Assume that Acme Complex has installed a facial scanner at the building entrance. If Alice has not successfully passed through the facial scanner in Building 302 today, or if she has already left the building, a person on the other end of the connection seeking access is not Alice.

Further assume that Alice works in Room 412, and that there is a hand geometry scanner at the entrance to this room. If Alice has not successfully passed through the hand scanner in Room 412, the person on the other end of the connection is not Alice.

Further assume that Alice has a specific workstation in Room 412, and that she has a fingerprint scanner on her desk. If Alice's fingerprint has not successfully passed that fingerprint scanner, the person on the other end of the connection is not Alice.

Further assume that Alice has a telephone on her desk. If we call that number, and no one answers, or the person who answers does not pass a voice print scan, we can say that the person requesting access to our system is not Alice.

Further assume that Alice has a supervisor named Bob. If we contact Bob to verify that the person at Alice's desk is Alice, and he fails to do so within some period of time, we may conclude that the person at the other end of the connection is not Alice.

We can call Alice at various times during the day, and have Bob audit her to determine that the person at the other end of the line is still Alice. Also, we can be notified by the hand scanner when Alice leaves Room 412 and by the facial scanner when Alice leaves the building. We can even require Alice to put her finger in the fingerprint scanner every few hours. So we have a variety of strategies to verify that it is still Alice who is at the other end of the connection.

These strategies are "orthogonal" in the sense that, for Eve to be accepted as Alice, Eve will have to beat multiple unrelated systems and corrupt unrelated people. All of these strategies are more powerful and reliable than the fact that at some point in the past Alice has been issued a digital certificate. First, the fact that a digital certificate is properly presented does not conclusively prove that Alice is at the other side of the connection. The certificate could be stolen or phony or someone else could be sitting at the computer where the certificate was installed.

Second, digital certificates can be stolen. Third, if someone can steal the secret key, the digital certificate can be remanufactured at will. Since the key can be stolen through copying, the theft of the key may not be detected for months. Fourth, a digital certificate has a lifetime and therefore a vulnerability of approximately six months, during which time it could be stolen or broken. A security device with a long period of vulnerability is not an optimal situation. For example, the digital certificate has such a long lifetime that a terrorist could defeat the digital certificate in some way and still have time to defeat another system such as a biometric device. Fifth, digital certificates are often issued by third party authorities, which means the organization has to rely on the security of a third party it does not control.

With the exception of Bob's audit of Alice, the orthogonal authentication procedures do not depend upon on-the-spot decisions made by human beings. The procedures described above will work as well at 4:00 pm in the afternoon, when humans become tired, as they worked at 8:00 am in the morning, when humans are alert. The procedures will work the same way whether Alice is a clerk or is the CEO. Bob is primarily called upon to perform the audit. His only "decision" is determine whether the person sitting at the desk is Alice or not Alice.

APPENDIX C

Data Packaging

The Secure Network system sends Secure Network packages directly over TCP/IP. A package is an object which will turn itself into a stream and unpack itself from a stream. A stream is a set of bits that can be sent over TCP/IP. The Secure Network packaging software also contains an Item class. Objects derived from the Item class can model any data format. Items can be inserted into and extracted from packages. Through the use of virtual functions a package can insert and extract a derived Item which it has never seen before.

The advantage of the Item class is that one can develop specific data formats for specific purposes, and also that compression can be applied at the Item level for data that is highly repetitive Items can contain longs, integers, bytes, bits, strings, and streams. Packages can be inserted into and extracted from packages. Packages have their own compression methods. Keys are typically generated inside Items as streams; items are inserted into packages, the package is compressed, and then encrypted with another key. No keys are stored in the clear. Keys are generally not stored on disk, and certainly not on the same disk where the files they encrypt are located.

The Secure Network can contain warehouses. A warehouse is a file into which packages can be inserted and extracted. Packages are always compressed and usually encrypted. Warehouses permit fast searches for packages.

The compression ratio for a package depends on the type of data that is inserted. Keys and random numbers are changed but not made smaller after compression. Certain other types of data can be compressed up to 10 times. Packages are also used to send application data and for key strobing. Any data loss or alteration will render the entire package unusable and unrecoverable and therefore immediately noticeable.

APPENDIX D

Network Generation

The Secure Network generator generates all of the executables and data files necessary to start a process at a particular IP address, and usually executed on the Secure Network server. Most of the data files are Secure Network warehouses, which store packages encrypted with a hard key, just randomly generated, which is embedded within the executables.

The Secure Network generator generates network parts from a template. The generator is critical for implementing strobed encryption and for extending the Secure Network system back through system design, testing and build. By putting the template and the generator under orthogonal audit control, control over who can design, build, test, and install a given network and who approves the design is possible. As part of each build, the source code is checked for network calls other than through the Secure Network API and for hidden back doors by other methods.

By generating network parts immediately before the node is installed, the Secure Network can provide start up keys that are only minutes old. If 10,000 employees in a large facility were due to access the computer facilities at 8:00 AM, a portion of the network generation might occur half an hour earlier. The last operation to occur would be the generation of the startup keys, which could be arranged to be within minutes rather than hours of the time a node was downloaded and installed.

APPENDIX E

Network Installation

Network installation means delivery of software and data files to a particular computer, starting a process to manage each Secure Network node on that computer, and providing some type of orthogonal authentication when the nodes have begun to connect. Nodes know all of the other nodes to which they are allowed to connect. When a node is started by a process, it automatically connects with all other allowable nodes with which it can establish a TCP/IP connection, and immediately begins strobing encryption keys. A node has available to it an initial set of encryption keys for each allowable connection.

Under the preferred installation procedure, the generator delivers the node files to an Secure Network database, and then creates a self-executing file called an intelligent agent. The intelligent agent is downloaded to a target site or device. When it is run, it knows how to connect to the database, and downloads and installs the files from the Secure Network database. This has a number of advantages. One advantage is that only the agent knows how to find the installation database. This is a prevention against denial of service attacks. It is difficult to conduct a denial of service attack against a database which is hidden. Secondly, this design facilitates a single installation at a known site. The agent knows where it is supposed to be, and if it is not where it is supposed to be, will not work at all. The database knows that a given agent is allowed to install only once, so if the same agent tries to install twice, something is wrong. This use of the agent might alleviate the need to telephone a password to the target site, although perhaps it is not a bad idea to add this embellishment anyway.

Other safeguards are programmed into the Secure Network node that is the target site. A Secure Network node listens on a port/IP address which has been randomly generated seconds before the installation and which is never made public; the node only accepts one connection to any other node; it knows what it is supposed to be listening for and can determine a fraudulent connection immediately if the IP address is wrong and after a single packet exchange, if the keys are wrong.

If a package is not correct (it cannot be decrypted, or after decryption, it cannot be inflated, or the check digit is wrong, or it cannot be unpacked), the package is rejected, and after a small number of such packages, the connection is closed.

If, despite these precautions, an intelligent agent were to be stolen, and installed fraudulently and it managed to connect successfully to the Secure Network server, the problem would become immediately apparent, if the installation needs to be orthogonally audited before any data is permitted to pass over the new connection. Also, when the real node attempted to install, the problem would again be obvious because the Secure Network permits only one connection between nodes. The optimal procedure is to generate the software for a node, install the node, and audit it within a matter of minutes.

From the point of view of an employee, this procedure might be as follows: the employee enters the building, passing through a biometric device such as a facial scanner or hand scanner; the employee enters his or her work area, passing through another biometric device. The employee turns on his or her computer, and uses a finger print scanner located on his or her desk. A minute later the telephone rings and the employee answers it. The computer then admits the employee to the applications on the network he or she is authorized to use.

APPENDIX F

Massively Scalable Secure Network

The Secure Network can connect two nodes or dozens of nodes, or even thousands of nodes. A portion of a massively scalable Secure Network architecture is shown below in FIG. 4. Under the architecture, the Secure Network has two parts. One side is used for strobing and the other side for sending application data. The top level node, node 1, controls which side is used for strobing and which side is used for sending data. After a strobe on one side is completed, and after waiting for some amount of time, node 1 sends messages so that the side previously used for strobing is now used to send data, and the side previously used to send data is now used for strobing. The amount of time after completion of a strobe on one side is dynamically configurable and can be used to control the amount of resources used by the system.

Under this architecture, any two nodes can be directly connected; otherwise nodes connect to nodes by going through various intermediary hops. The design possibilities are very flexible. As a package passes through the hops, it is protected by end-to-end strobed encryption, in which the keys strobe between the node at which the package originated and the node that is its destination.

Application nodes have been arbitrarily numbered in a sequences beginning with 32261 and 65441 in order to illustrate a hypothetical network of approximately 10,000 application nodes. Nodes at indenture levels 0 though 4, that is all nodes with numbers less than 9999, are router nodes. The system has two separate networks of router nodes, a system with positive numbers and a system with negative numbers. Nodes at indenture level five can communicate by sending packages through either side of the network. Nodes can also be directly connected with one another. For example, 32262 directly connects with 65447.

APPENDIX G

Strobed Encryption

Strobed encryption is a proprietary protocol which changes both asymmetric and symmetric keys periodically. A strobe occurs at the moment a connection is made and then periodically thereafter.

The First Exchange

The first strobing exchange starts with a set of keys that are present on network installation. Network keys and all files and software needed to connect to nodes are generated automatically by the Secure Network generator and downloaded through one of the Secure Network installation methods.

For example, suppose that we want to connect node A and B under the Secure Network. Go through the following steps.
 1. Generate the software and software files necessary to connect A and B, including symmetric keys needed to encrypt data between A and B. At the present time, use a 448 bit Blowfish key and a one-time pad of 2000 or more bytes. The generator randomly generates two sets of keys, one set for each direction, for each connection.
 2. Download the software to the computers on which A and B are to be located. (For this example we are assuming that A and B are to be located on different computers). There are several ways of doing this, as explained below.
 3. Start the process managing the connection. The nodes will automatically connect when the other side comes up assuming that the two processes are connected via TCP/IP.
 4. The two connections will immediately strobe all encryption keys.
 5. Audit the connection.
 6. Continue to strobe every so often, maybe every 30 seconds.

The time between generating the network parts and the first connection could be only a few minutes. Immediately the node will be "audited" by being orthogonally authenticated in some way. If someone in the minute or so between the generation of the A/B connection parts and the real installation of A and B, could steal all of the parts to make the A connection, and could install A, and spoof the IP address, and could somehow connect to B, and do the first strobe, when it comes time for the actual A to connects B will not connect a second time to A. It will become immediately obvious that something is wrong. The Secure Network is designed so that only one connection between two nodes is possible.

Details of One Example of Strobed Encryption

This is an example of strobing as currently implemented.
Notation:
[ ] is a compressed ANGEL package;
{ } refers to a non-compressed ANGEL package.
(key) means encrypt what is to the right with key.
, a comma separates packages and items that have been inserted into a package.
Index means an item that usually appears at the front of the payload package.

A package is a C++ object which is capable of turning itself into a stream suitable for transport over TCP/IP and of recovering itself from a TCP/IP stream. The package is also a container into which other packages can be inserted and from which other packages can be extracted. Items can also be inserted into and extracted from packages. Extraction from and insertion into a package is only possible if the containing package is non-compressed. Compressed packages can be inserted into and extracted from non-compressed packages. An Item is a C++ object which, through derivation, can model any data format. Packages have their own compression methods. It is also possible to selectively compress data as the data is added to an item.

Initial keys are first generated. In the preferred implementation, the following initial keys are generated for encrypting packages sent between two sides of a TCP/IP connection. These keys are already installed either by the installation program or by the previous strobe. Strobing involves randomly generating and changing these keys. The initial keys include:

| | |
|---|---|
| $e^{out}$ | Blowfish 448 bit key to encrypt outbound packages |
| $k^{out}$ | one-time pad (2000 or more bytes) to encrypt outbound packages |
| $e^{in}$ | Blowfish 448 bit key to encrypt inbound packages |
| $k^{in}$ | one-time pad (2000 or more bytes) to encrypt inbound packages |

Package encryption is also used. The package actually sent over TCP/IP is referred to as the payload package. This package consists of an Index item plus some number of other packages and items.

The Strobe sequence is as follows:
State0
State0 is the initial state after two nodes have been installed.
Node A
(1) Create Keys:

| | |
|---|---|
| $s^A$ | RSA secret key. |
| $p^A$ | RSA public key. |

(2) Prepare a payload package and send it to the other side: $k^{out}(e^{out}([\text{Index}, p^A]))$ This notation indicates that we have inserted Index, and $p^A$ into a payload package, which is compressed, and then encrypted first with $e^{out}$ and then with $k^{out}$. We only use as much of $k^{out}$ as is necessary to XOR the payload package. If we used up $k^{out}$ before we have a chance to do another strobe, we are forced to commit the cryptographic sin of reusing some part of $k^{out}$. However, we can avoid this problem by making $k^{out}$ large enough for potential needs.

Node B
Node B listens for a connection.
State1
Node A
Node A waits for a response from Node B.
Node B
(1) Extract $p^A$ from the incoming data stream.

Node B will decrypt the incoming stream with $k^{in}$ then with $e^{in}$, then inflate the package. The package will now be {Index, $p^A$}, that is, it is a non-compressed package containing two objects, an Index object, the public key from Node A, $p^A$.

$k^{in}$ and $e^{in}$ are identical to $k^{out}$ and $e^{out}$ used on the connect side. If this is the first strobe, this match up will be performed by the generator and the installation procedure. If this is an ongoing strobe, this match would have been performed by the previous strobe.

(2) Generate keys:

| | |
|---|---|
| $e^B$ | Blowfish 448 bit key |
| $s^B$ | RSA secret key |
| $p^B$ | RSA public key |
| $k^B$ | One time key pad |

(3) Make the payload package and send it to the other side. $k^{out}(e^{out}([\text{Index}, p^A([e^B, k^B, p^B])]))$
(4) Install new keys as follows:
$e^B$ as $e^{out}$
$k^B$ as $k^{in}$
State2
Node A
(1) Decrypt the incoming package with $k^{in}$ and $e^{in}$, and extract $p^A([e^B, k^B, p^B])$ Use $s^A$ to decrypt $[e^B, k^B, p^B]$. Decompress and extract $e^B$, $k^B$, and $p^B$.
(2) Generate keys:

| | |
|---|---|
| $e^A$ | 448 Blowfish key |
| $k^A$ | one-time pad |

(3) Install
$k^A$ as $k^{out}$
$k^B$ as $k^{in}$ (4) Make and send the payload package to the accept side $k^{out}(e^{out}([\text{Index } p^B([e^A, k^A])]))$
(4) Install
$e^B$ in $e^{in}$
$e^A$ as $e^{out}$
Node B
Node B waits for a response from Node A.
State3
Node A
Node A waits for a response from Node B.
Node B
(1) Decrypt and inflate the payload package and extract $p^B([e^A, k^A])$
(2) use to decrypt $([e^A, k^A])$
(3) Install:
$k^A$ as $k^{out}$
$e^A$ as $e^{in}$
(4) Send a notification message to Node A.
State4

Strobing is complete, and nodes A and B may now begin transmitting data to each other encrypted using their respective $k^{out}$, $k^{in}$, $e^{out}$, $e^{in}$ keys.

Use of the One-Time Pad

In one embodiment, the Secure Network system can send a one-time pad encrypted with other one-time pads and other session keys. If an enemy were to attempt a brute force attack on encrypted "text", when the enemy had guessed the correct method of decryption, the enemy would realize that it had succeeded because the encrypted text would be plaintext and identifiable as such. However, applying a brute force attack to recover an encrypted one-time pad is more difficult because of the problem of distinguishing between a correctly and incorrectly decrypted one-time pad. The one-time pad is merely a sequence of random numbers. The "correctly decrypted one-time pad" can only be identified as correctly decrypted when it is applied to some cipher text and produces something recognizable as plaintext. Under the Secure Network system, the cipher text that can be used to identify a correctly decrypted one-time pad will not be sent until later, so at the very least a brute force attack cannot be successfully implemented against the one-time pad until the plaintext is sent.

The problem that the one-time pad must be as long as the message is real; however, we have methods for strobing the one-time pad on one channel while sending messages on the other. For continuous encryption there is a danger of running out of the old one-time pad before a new one arrives, he one-time pad cannot be reused. However, many applications do not require continuous encryption, and it you want to send a smaller amount of data, and you want to encrypt that data as fast as possible, a one-time pad is very rapid. For example, a radar looks at the sky and sees nothing for days at a time. Suddenly something appears.

It would be appropriate to use a one-time pad to transfer that small amount of critical data. Many applications, such as, for example, money transfer, send relatively tiny amounts of data interspersed with relatively large periods of inactivity. For these applications, there is a relatively small danger of running out of a one-time pad.

Of course, if the application does run out of the old one-time pad, in the time before the next one-time pad arrives, the application has to use other encryption methods and must not reuse the old one-time pad.

What is claimed is:

1. A secure identification control system comprising:
   A. at least one body sensor configured to sense biometric information from a body;
   B. a handheld node comprising an interface to the at least one body sensor and an interface to a secure network, wherein the handheld node is configured to record biometric information, including information indicating removal of the body sensor from the body;
   C. the secure network including at least one server node configured to deliver to the handheld node an agent module, said agent module comprising a node specific configuration file defining a set of nodes with which the handheld node can communicate and a different encryption means corresponding to each node in the set of nodes;
   D. a set of detectors configured to sense a handheld node location; and
   E. an identification controller coupled to the secure network and configured to generate an identification indication as a function of the handheld node location and an authentication of the body from the handheld node, wherein such authentication is a function of an indication from the handheld device that the at least one body sensor had not been removed from the body.

2. The secure identification control system of claim 1, wherein the set of detectors includes one or more detectors configured for communicating via florescent lights or by retroreflective illumination.

3. The secure identification control system of claim 1, wherein the body is a passenger in a vehicle.

4. The secure identification control system of claim 1, wherein the identification controller is configured for granting access to a secure facility or area.

5. The secure identification control system of claim 1, wherein the identification controller is configured for providing the identification indication to a friendly fire prevention detection system.

6. The secure identification control system of claim 1, wherein each of the at least one body sensors comprises at least one biometric sensor.

7. The secure identification control system of claim 6, wherein the handheld node receives biometric data from the at least one biometric sensor.

8. The secure identification control system of claim 6, wherein the at least one biometric sensor is selected from the group consisting of: a face scanner, palm scanner, retina scanner, fingerprint scanner, and any combination thereof.

9. The secure identification control system of claim 1, wherein the handheld node interfaces with the user.

10. The secure identification control system of claim 1, wherein the handheld node comprises at least one telephone.

11. The secure identification control system of claim 1, wherein the user-specific data comprising audio signals.

12. The secure identification control system of claim 7, wherein the handheld node integrates with the at least one biometric sensor.

* * * * *